United States Patent [19]
Takayama et al.

[11] Patent Number: 5,875,082
[45] Date of Patent: Feb. 23, 1999

[54] MAGNETIC RECORDING MEDIA, MAGNETIC HEADS AND MAGNETIC READ-WRITE APPARATUS USING THE SAME

[75] Inventors: Takanobu Takayama, Toride; Kiwamu Tanahashi, Fujisawa; Kazuetsu Yoshida, Hidaka; Mikio Suzuki, Odawara; Yoshiyuki Hirayama, Kodaira; Masaaki Futamoto, Kanagawa-ken; Yohji Maruyama, Iruma, all of Japan

[73] Assignee: Hitachi, Ltd., Tokyo, Japan

[21] Appl. No.: 794,709

[22] Filed: Feb. 4, 1997

[30]      Foreign Application Priority Data

Feb. 5, 1996  [JP]  Japan .................................. 8-018620

[51] Int. Cl.$^6$ ........................................................ G11B 5/62
[52] U.S. Cl. ................................................................. 360/131
[58] Field of Search ..................................... 360/131–135

[56]          References Cited

FOREIGN PATENT DOCUMENTS 58-128023A  7/1983  Japan .

OTHER PUBLICATIONS

Iwasaki and Ouchi: IEEE Transactions on Magnetics, vol. MAG–14, No. 5, Sep. 1978, pp. 849–851.

Yoshida, Shinohara and Odagiri: Journal of The Magnetics Society of Japan, vol. 18, Supplement, No. S1 (1994), pp. 439–442.

Tagawa, Shimizu and Nakamura: Journal of the Magnetics Society of Japan, vol. 15, Supplement, No. S2 (1991), pp. 827–832.

Primary Examiner—Robert S. Tupper
Attorney, Agent, or Firm—Kenyon & Kenyon

[57]             ABSTRACT

A magnetic recording medium wherein, when the axis of easy magnetization of the magnetic recording medium for magnetically recording information by means of a magnetic head is projected onto a surface of the magnetic recording medium, the axis projected onto the surface of the magnetic recording medium exists so as to be unidirectionally inclined with respect to the direction of a track on which information is to be recorded, whereby, by using the magnetic recording medium, there can be provided a magnetic head and a magnetic read-write apparatus greatly improved in longitudinal recording density.

16 Claims, 8 Drawing Sheets

MAGNETIC RECORDING MEDIA, MAGNETIC HEADS AND MAGNETIC READ-WRITE APPARATUS USING THE SAME

BACKGROUND OF THE INVENTION

The present invention relates to a magnetic recording mode for improving surface recording density greatly and particularly to magnetic recording media, magnetic heads and a magnetic read-write apparatus using the same for achieving high-density magnetic recording.

Recently, improvement of recording density in the field of magnetic recording, particularly in magnetic recording disks, is remarkable and researches and developments are being hastened to achieve a higher-density read-write apparatus. The recording mode used in magnetic recording disks at present is a longitudinal magnetic recording mode in which recorded magnetization is directed to a track. In order to improve the recording density more greatly, a perpendicular magnetic recording mode free from self-demagnetization even in high linear recording density has been proposed or researched eagerly to be used in magnetic recording media (Iwasaki and Ouchi: IEEE Trans. Magn., MAG-14, 849 (1978), and so on) but the mode has been not yet put into practical use.

On the other hand, an obliquely magnetic recording mode free from self-demagnetization even in high linear recording density as well as the perpendicular magnetic recording mode is used in the field of VTRs in which longitudinal magnetic recording is mainly carried out. Particularly, as for a recording medium, an obliquely deposited Co—Ni tape has been put into practical use as a high-band 8 mm VTR magnetic tape, and a tape improved in characteristic is expected to be used also as a small-size digital VTR tape in the future (Yoshida, Shinohara and Odagiri: Journal of The Magnetics Society of Japan, Vol. 18, No. S1,439 (1994)).

In a magnetic recording using a ring type magnetic head used in magnetic recording at prevent, the fact that the obliquely magnetic recording mode is more preferable in high-density recording than the longitudinal magnetic recording mode and the perpendicular magnetic recording mode has been confirmed by the simulation by Tagawa et al in Tohoku University (Tagawa, Shimizu and Nakamura: Journal of The Magnetic Society of Japan, Vol. 15, No. S2,827 (1991)). Also in magnetic recording disks, it is expected that recording density will be improved remarkably by use of the obliquely magnetic recording mode.

In the case of a magnetic tape, a magnetic recording medium having an axis of easy magnetization inclined to the recording direction can be formed by obliquely depositing, for example, a ferromagnetic Co—Ni alloy. In the case of a magnetic disk, it is theoretically possible to form a magnetic recording layer having an axis of easy magnetization inclined circumferentially on a circular substrate as disclosed also in JP-A-58-128023, but it is difficult to mass-produce such magnetic disks as products. Accordingly, to put magnetic recording disk devices using an obliquely magnetic recording mode into practical use has been considered to be almost impossible.

SUMMARY OF THE INVENTION

The present invention is intended to solve above-mentioned problems. A first object of the present invention is therefore to propose a magnetic recording mode for realizing an obliquely magnetic recording mode in a magnetic recording disk so as to provide a high-density large-capacity magnetic read-write apparatus which has been never provided. A second object of the present invention is to provide a magnetic recording medium suitable for realizing an obliquely magnetic recording mode. A third object of the present invention is to provide a magnetic head suitable for realizing an obliquely magnetic recording mode.

In order to apply an obliquely magnetic recording mode to a magnetic recording disk, conventionally, it was considered to make the axis of easy magnetization in a magnetic recording layer formed on a circular substrate inclined circumferentially. But, although it was possible theoretically, the process how to produce the magnetic recording medium was hard in terms of mass-production so that the magnetic recording medium could not be realized.

Therefore, the inventors of the present application have made researches actually upon the thought that obliquely magnetic recording can be carried out on a magnetic recording disk by using a magnetic recording medium having a radially inclined axis of easy magnetization of a magnetic recording layer formed on a circular substrate and by using a magnetic head for effectively generating a magnetic field radially. As a result, the present inventors have found that not only obliquely magnetic recording can be made but also extremely high recording density compared with the conventional longitudinal magnetic recording mode can be achieved.

That is, the above-mentioned first object of the present invention is achieved by performing recording, for example, by using a medium having an axis of easy magnetization inclined in the direction of the radius of a circular substrate and by using a ring type magnetic head having a yaw angle not smaller than 15 degrees. The second object is achieved, for example, by forming a medium structure in which the axis of easy magnetization is inclined in the direction of the radius of a circular substrate. The third object of the present invention is achieved, for example, by forming a structure in which a gap portion of a magnetic head is largely inclined with respect to the circumferential direction of a circular recording substrate to its radial direction.

Incidentally, in the process of researches for the present invention, the present inventors have found that read-write can be made sufficiently even in the case where a mode in which the axis of easy magnetization of a medium is projected in a direction perpendicular to the direction of relative movement between a magnetic head and the medium and the direction of head magnetic field is suitably inclined is applied to a magnetic recording tape, similarly to the case of the aforementioned magnetic recording disk. The present inventors further have found that, even in either case of a magnetic recording disk or a magnetic recording tape sufficiently high recording density can be achieved not only when the axis of easy magnetization of the medium is perpendicular to the direction of the relative movement between the magnetic head and the medium but also when the axis of easy magnetization of the medium is inclined suitably with respect to the direction of the relative movement between the magnetic head and the medium.

Further, the present inventors have applied a mode, in which a neutral period is provided without making inversion of the polarity of a recording current supplied to the recording magnetic head when the recording current is to be inverted, to the relative positional relation between the medium and the magnetic head. As a result, the present inventors have found that the out-put/medium noise (S/N) ratio can be improved greatly to the same degree as in the case of ordinary oblique magnetic recording so that the recording density can be improved.

FIG. 1 shows an example of the structure of a magnetic recording medium and a magnetic head for explaining a magnetic recording mode according to the present invention in which the axis of easy magnetization of the magnetic recording medium exists in a plane perpendicular to the recording track direction. The portion encircled with broken lines in FIG. 1 is a partially enlarged view to show an inclination relation between a recording track and magnetic poles.

First, the axis of easy magnetization 120 of a magnetic recording layer 110 of a magnetic recording medium 100 exists in a plane perpendicular to a recording track 130. Next, a gap portion 220 formed by two magnetic poles 210 and 211 of a magnetic head 200 is disposed to be largely inclined with respect to the recording track direction 130 so that an intensive magnetic field is generated in a direction which is inclined from the recording track direction. Accordingly, the magnetic field generated from the head 200 has effectively intensive magnetic field components also in the direction of the axis of easy magnetization 120 of the magnetic recording medium 100. In such a configuration as described above, magnetization of the medium in which the axis of easy magnetization 120 exists in a plane perpendicular to the recording track 130 is recorded by the intensive recording magnetic field components in a direction perpendicular to the recording track direction.

Because it has been found that, though it could not be thought of so far from the common sense, sufficient magnetic recording can be made even in the case where the axis of easy magnetization is perpendicular to the recording track, it is apparent that recording can be carried out in the case where the axis of easy magnetization of the medium projected onto a surface of the magnetic recording medium is inclined suitably with respect to the direction of recording track. Incidentally, though the reason is not apparent, it has become clear, from the result of the inventors' researches, that the case where the axis of easy magnetization of the medium projected onto the surface of the magnetic recording medium is inclined suitably with respect to the direction of recording track is rather preferable in terms of high S/N and high-density recording than the case where the axis of easy magnetization of the medium projected onto the surface of the magnetic recording medium is coincident with the direction of recording track.

Incidentally, in the field of VTRs, for example, because of a helical scan mode, the direction of relative movement between the magnetic head and the magnetic recording medium is slightly different from the direction of the axis of easy magnetization of the medium projected onto the surface of the medium, while the direction of relative movement is substantially near to the direction of the axis of easy magnetization of the medium projected onto the surface of the medium. Further, in the field of VTRs, an azimuth recording mode, in which a relative gap angle (azimuth) between two heads used for recording and reproducing is inclined in advance by ±θ to reduce cross-talk by using azimuth loss, is employed in order to eliminate a guard band between tracks to thereby improve track density. If the axis of easy magnetization of the medium is projected onto the surface of the medium, however, the direction of projection exists at an angle near to the recording track direction. In contrast thereto, in the present invention, when the axis of easy magnetization of the medium is projected onto the surface of the medium, the direction of projection is inclined largely with respect to the direction of recording track. That is, the present invention is essentially different from the conventional case regardless of the direction of the gap of the magnetic head.

DETAILED DESCRIPTION OF THE PREFERRED EMBODIMENTS

Examples according to the present invention will be described below.

EXAMPLE 1

Figure 1:
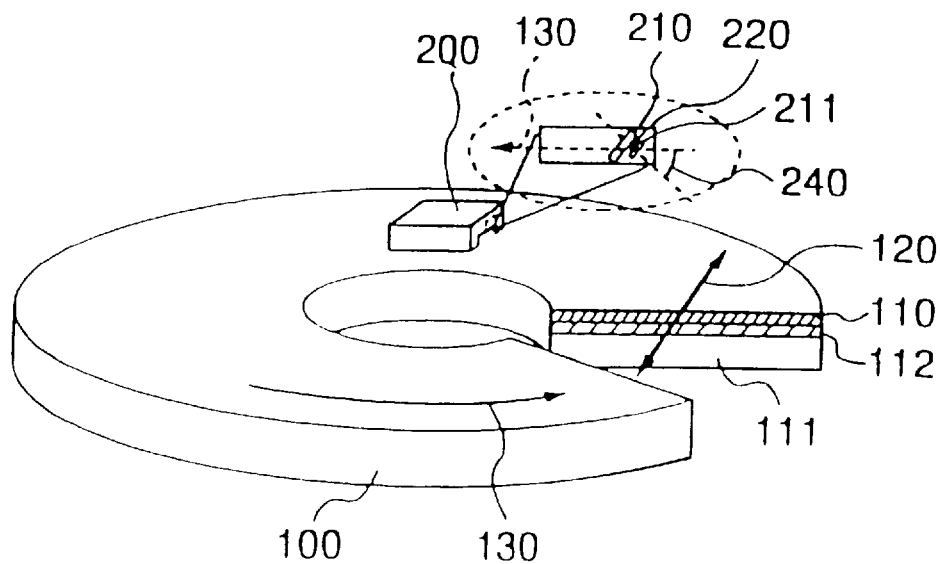
FIG. 1 is a view showing a magnetic recording medium and a magnetic head according to the present invention.
Figure 2:
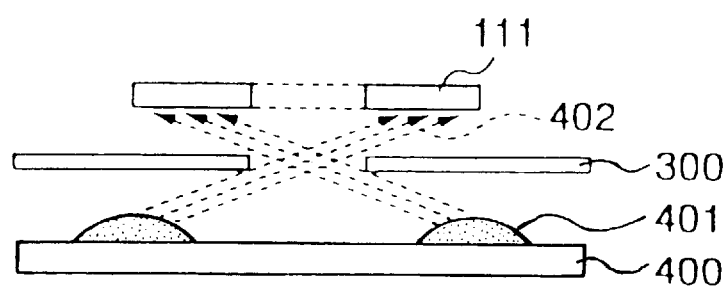
FIG. 2 is a conceptual view of an obliquely incident sputtering method for producing the magnetic recording medium according to the present invention.
Figure 3:
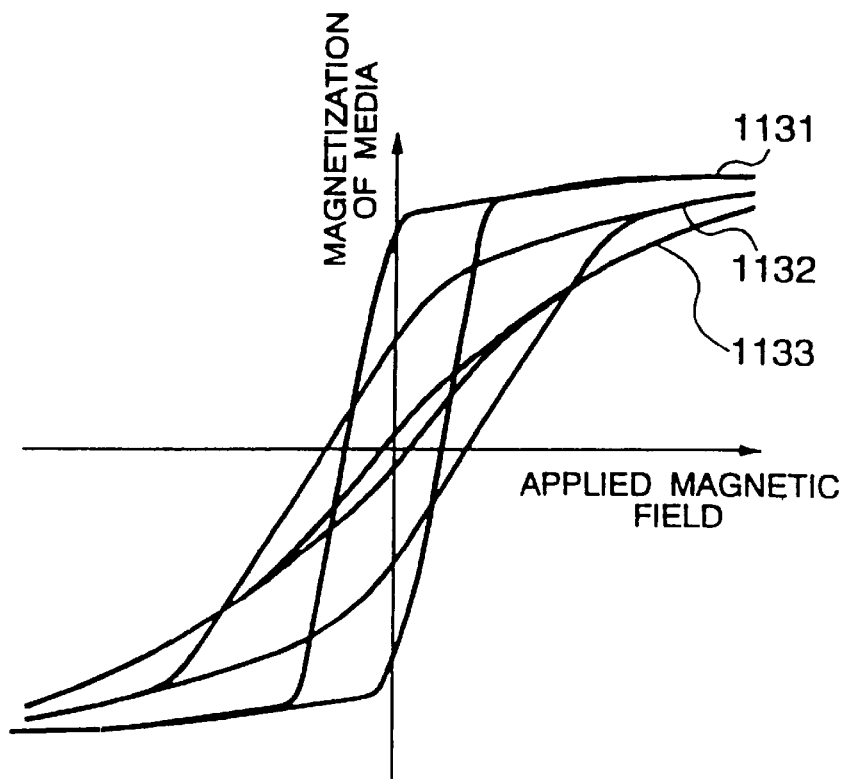
FIG. 3 is a graph showing an example of the magnetization curve of the magnetic recording medium according to the present invention.

As shown in FIG. 2 which is a conceptual view, a magnetic recording medium according to the present invention was produced by an obliquely incident sputtering method. A sputtering apparatus the same as that used at present for producing longitudinal magnetic recording media was used, in which a circular aperture 300 was provided between a circular sputter target 400 and a circular substrate 111 so that when volumetric particles 402 were flown from the target 400 onto the substrate 111 by sputtering, the components which were flown in the direction of the radius of the substrate 11 from a sputter particle high-density generating region 401 concentrically existing on a surface of the target 400 were made to deposit. In such an arrangement, Ti as an undercoat of a magnetic recording layer was formed with a thickness of 50 nm and a Co—Cr—Ta alloy as the magnetic recording layer was formed with a thickness of 100 nm thereon. Incidentally, the Co—Cr—Ta alloy as the magnetic recording layer was formed in the same manner as generally used for forming longitudinal magnetic recording media. As a result, it was confirmed by use of an X-ray diffraction method that both in the Ti undercoat and the Co—Cr—Ta film, the c-axis was inclined with respect to a direction perpendicular to the film surface to the direction of the radius thereof. Further, the magnetic recording medium thus produced according to the present invention was cut out and magnetization curves in circumferential, radial and perpendicular directions with respect to the substrate were measured. As a result, as shown in FIG. 3, the magnetization curve in the circumferential direction was inclined to form a narrow hysteresis curve 1133, the magnetization curve in the radial direction was slightly inclined but good in squareness to form a large hysteresis curve 1131, and the magnetization curve in the perpendicular direction was good in squareness to form a large hysteresis curve 1132. From such a fact, it is considered that the axis of easy magnetization of the thus formed magnetic recording medium is inclined radially with respect to the direction perpendicular to the film surface and that the axis of hard magnetization is formed relatively in the direction of the circumference.

Further, as a first comparative example, a Cr undercoat with a thickness of 50 nm was formed by using a sputtering apparatus before the attachment of the circular aperture and a thickness of 20 nm was formed thereon from the same composition as the Co—Cr—Ta alloy film according to the present invention to thereby form a longitudinal magnetic recording medium. As a second comparative example, a Ti undercoat with a thickness of 50 nm was formed by using a sputtering apparatus before the attachment of the circular aperture and a thickness of 100 nm was formed thereon from the same composition as the Co—Cr—Ta alloy to thereby form a perpendicular magnetic recording medium.

Figure 4:
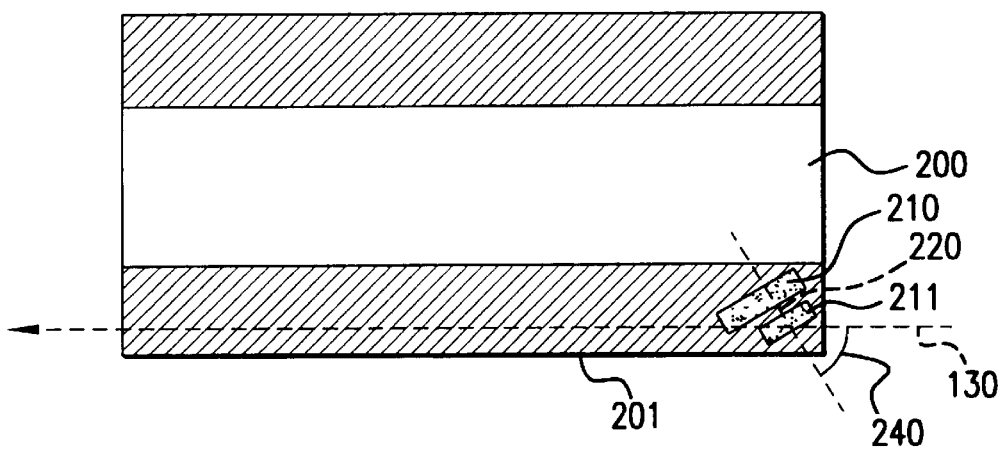
FIG. 4 is a view showing an example of the model of the magnetic head having surfaces opposite to the recording medium according to the present invention.

FIG. 4 is a model view showing the magnetic head having surfaces opposite to the recording medium according to the present invention. In this example, a magnetic head was produced in the same process as that used for producing a thin-film head currently used for a magnetic recording disk, and a slider 201 was cut out obliquely so that the gap portion 220 was inclined by 60 degrees with respect to a recording track direction 130, that is, the yaw angle 240 was established to be 60 degrees. Incidentally, for comparison between the longitudinal recording and perpendicular recording, the same thin-film recording head was produced by cutting out the slider 201 at an ordinary angle so that the gap portion 220 was opposite to the recording track direction 130, that is, the yaw angle was established to be 0 degree.

Thus, head media for oblique recording, longitudinal recording and perpendicular recording were produced respectively and the read-write characteristics thereof were evaluated and compared. Incidentally, recording at the yaw angle of 60 degrees was compared with recording at the yaw angle of 0 degree upon the assumption that the relative speed of the head-medium was substantially equal to the cosine of 60 degrees (cos60°) so that the linear recording density was regarded as being the reciprocal of cos60° (two times) and the measured values of reproduced output and noise were regarded as being doubled in the case where the relative speed and recording frequency of the head-medium were equal between the recordings at the yaw angles of 60 degrees and 0 degree. Table 1 shows results expressed in relative decibel value by reference to the case where the yaw angle was 0 degree with respect to a longitudinally oriented medium.

TABLE 1

| Media type | Yaw angle | $S_{1kFCI}$ | $S_{150kFCI}$ | $N_{150kFCI}$ | $S/N_{150kFCI}$ |
|---|---|---|---|---|---|
| longitudinally oriented medium | 0 degree | 0 (reference) | 0 (reference) | 0 (reference) | 0 (reference) |
| perpendicularly oriented medium | 0 degree | −0.5 | +0.3 | −2.1 | +2.4 |
| obliquely oriented medium | 60 degrees | +2.5 | +6.3 | −3.5 | +9.8 |

As shown in Table 1, it is found that not only the oblique recording is high both in reproduced output and in recording resolution but also the oblique recording is low in medium noise and is improved greatly in reproduced output/medium noise ratio in the high-density region. Further, when, for example, the yaw angle is 60 degrees as shown in this example, the effective write track width can be reduced to a half compared with the case where the yaw angle is 0 degree. Accordingly, it has been confirmed theoretically, as shown in this example, that longitudinal recording density several times as much as the existing longitudinal recording density can be achieved by using a disk medium having the axis of easy magnetization inclined radially with respect to the direction perpendicular to the film surface and by using a write head having the yaw angle established to be large.

If the axis of easy magnetization of the magnetic recording medium on the circular substrate is projected onto the substrate surface because of the condition of geometrical arrangement of the circular target 400, the circular aperture 300 and the substrate 111, the unevenness of the sputter particle high-density generating region 401 generated on the surface of the target 400, and so on, when the recording medium having the axis of easy magnetization inclined radially with respect to the direction perpendicular to the film surface is formed, there is a region in which the projected axis of the easy magnetization exists between the radial direction and -the circumferential direction. The read-write characteristics of such a region was evaluated. As a result, sufficiently high recording resolution and reproduced output/medium noise ratio were obtained not only in the case where the yaw angle was formed in the write head as described above but also in the case where the yaw angle was set to be 0 degree.

EXAMPLE 2

Because good recording resolution and reproduced output/medium noise ratio were obtained when the axis of easy magnetization projected onto the substrate surface existed between the direction of the radius of the circular substrate and the direction of the circumference thereof, the relation between the direction of the axis of easy magnetization and the read-write characteristics was examined by using the obliquely oriented deposition tape.

For the obliquely oriented deposition tape, a magnetic recording layer having a thickness of 2 μm was formed by depositing Co in the atmosphere of introduced oxygen by using the same winding type film-forming apparatus as used for producing the obliquely deposition tape available on the market as an 8 mm VTR tape. If the axis of easy magnetization obliquely oriented with respect to the substrate surface in this magnetic recording layer in the same manner as the available oblique deposition tape was projected onto the substrate surface, the projected axis existed in the direction of taking-up of the substrate. Samples cut out at various angles with respect to the deposition film prepared as described above were set in a magnetic recording tape read-write evaluation apparatus to examine the characteristics of the samples. The cut-off angles are selected to be an angle (0 degree as a reference value) parallel to the taking-up direction of the substrate, 10 degrees, 20 degrees, 30 degrees, 45 degrees, 60 degrees, 75 degrees and 90 degrees in the case where the cut-off angle is perpendicular to the taking-up direction of the substrate. The evaluation of the read-write characteristics was made by measuring reproduced output and medium noise at the time of recording in the linear recording density of 100 kFCI and performing relative comparison.

Figure 5A:
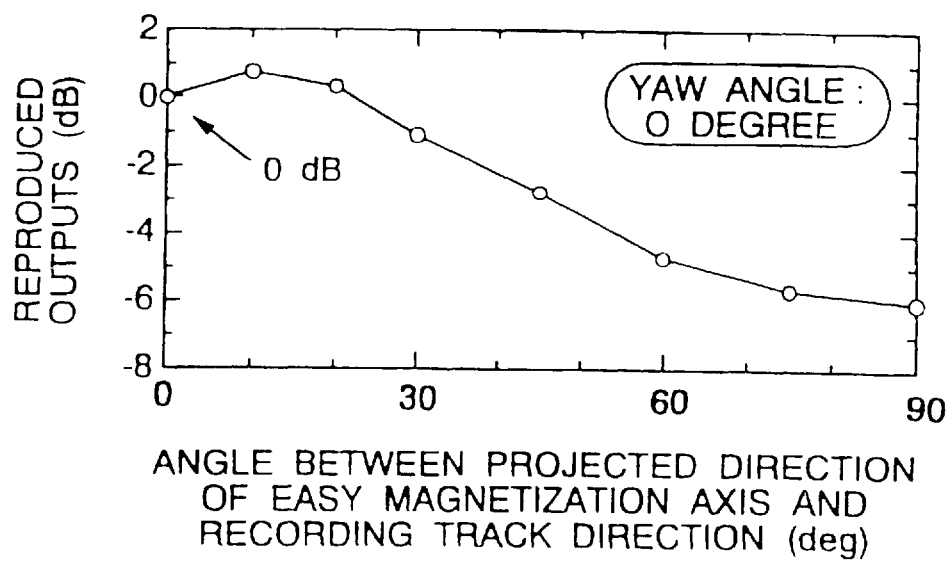
FIG. 5 is a graph showing examples of read-write characteristics measured with the yaw angle of the magnetic head set to be 0 degree upon media different in the angle between the axis of easy magnetization projected onto a substrate surface and the tracking direction.
Figure 5B:
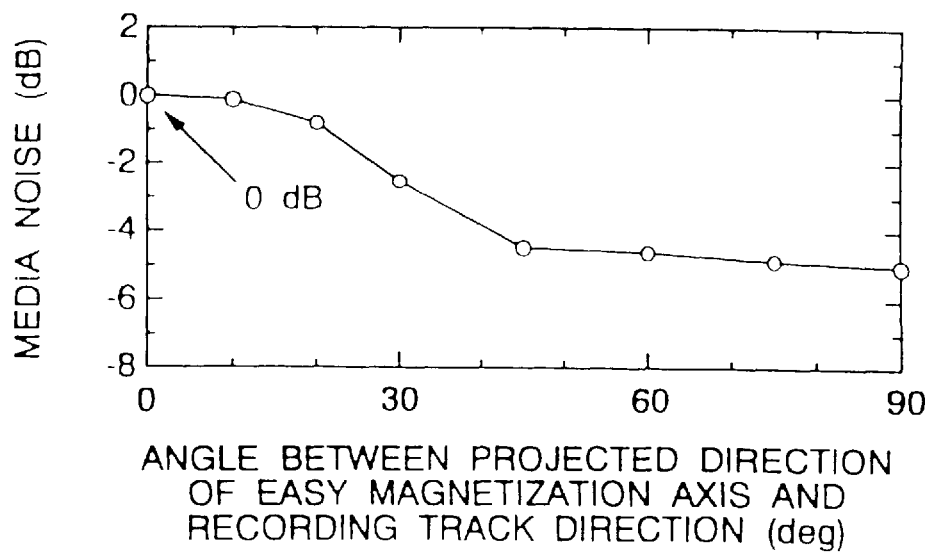
Figure 5C:
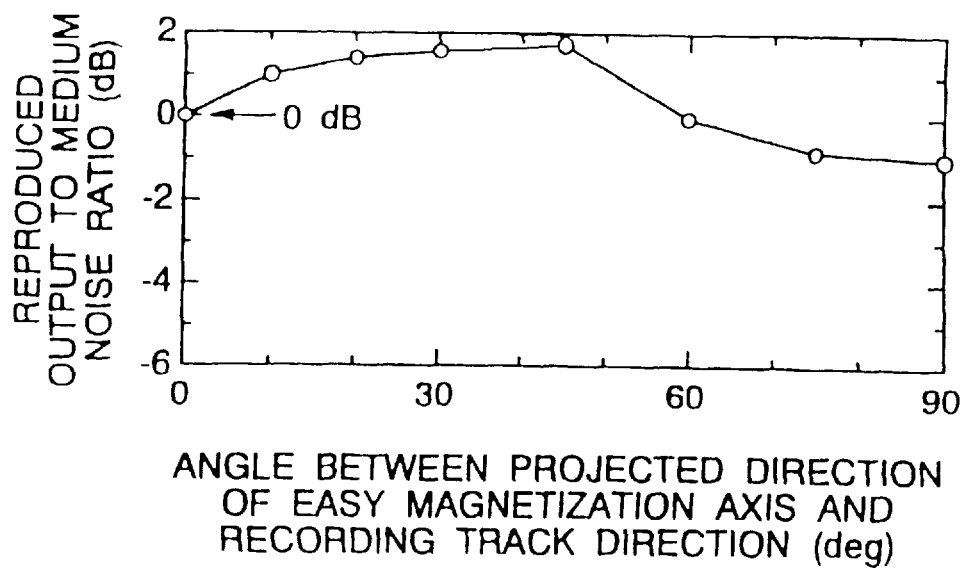

First, the evaluation result in the case where the gap portion of the magnetic head is made to be perpendicular to the recording track direction, that is, in the case where the yaw angle is 0 degree, is shown in FIG. 5. Although the reproduced output showed a tendency to decrease when the angle between the axis of easy magnetization projected onto the substrate surface and the tracking direction shifted widely, good characteristic was exhibited unexpectedly in the case where the angle shifted in a range of from 10 degrees to 20 degrees. On the other hand, the medium noise was reduced greatly when the angle between the axis of easy magnetization projected onto the substrate surface and the tracking direction became 30 degrees or higher. As a result, it was found that the reproduced output/medium noise ratio was improved when the angle between the axis of easy magnetization projected onto the substrate surface and the tracking direction was in a range of from 20 degrees to 45 degrees compared with the case where the angle between the axis of easy magnetization projected onto the substrate surface and the tracking direction was 0 degree.

Figure 6A:
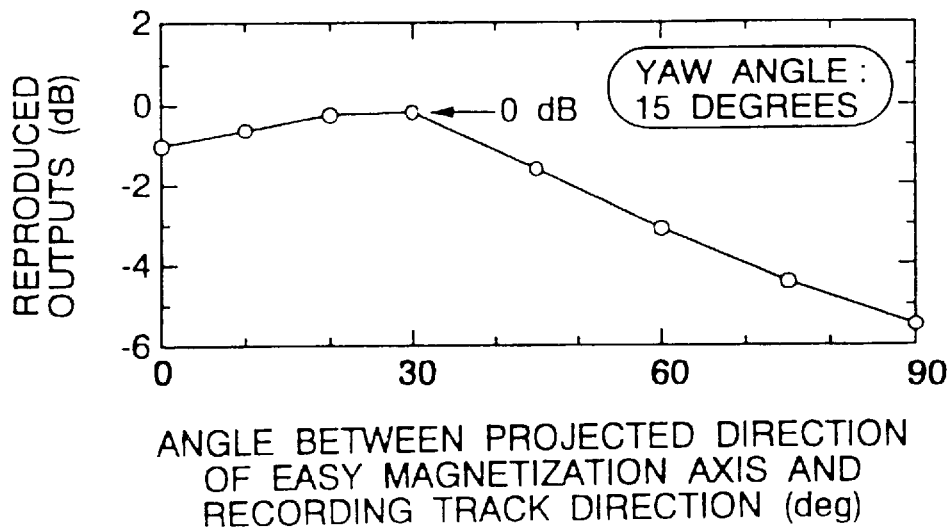
FIG. 6 is a graph showing examples of read-write characteristics measured with the yaw angle of the magnetic head set to be 15 degrees upon media different in the angle between the axis of easy magnetization projected onto a substrate surface and the tracking direction.
Figure 6B:
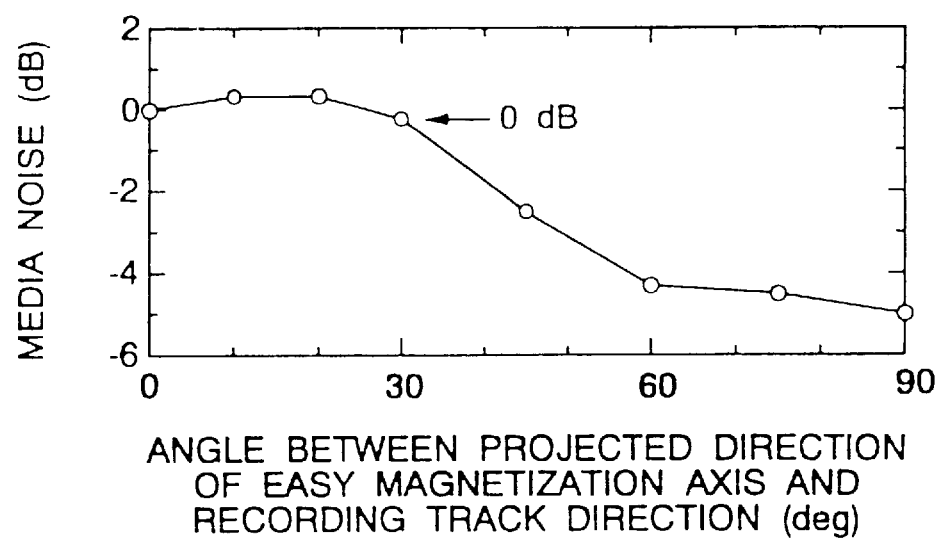
Figure 6C:
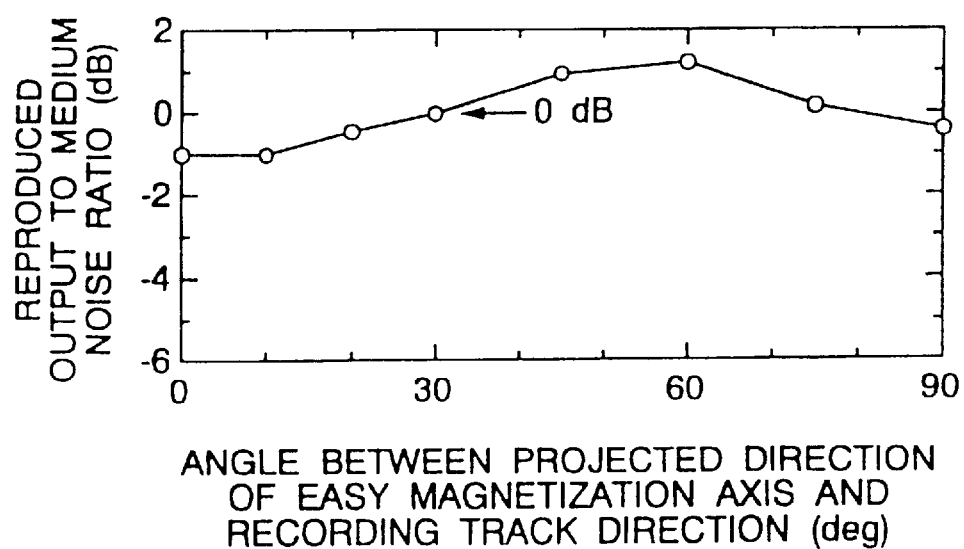

Then, read-write characteristics were evaluated by using the same tape-like recording samples in the condition that the yaw angle of the magnetic head was 15 degrees. The result is shown in FIG. 6. In the case, because the highest reproduced output was obtained when the angle between the axis of easy magnetization projected onto the substrate surface and the tracking direction was 30 degrees, the reproduced output, medium noise and reproduced output/medium noise ratio were expressed by reference to those obtained when the angle between the axis of easy magnetization projected onto the substrate surface and the tracking direction was 30 degrees. The reproduced output was reduced if the angle between the axis of easy magnetization projected onto the substrate surface and the tracking direction was not smaller than 30 degrees, but the reduction was small compared with the case where the yaw angle was 0 degree. On the other hand, in the sample in which the angle between the axis of easy magnetization projected onto the substrate surface and the tracking direction was not smaller than 30 degrees, the medium noise was reduced greatly and, as a result, the highest reproduced output/medium noise ratio was obtained in the case where the angle between the axis of easy magnetization projected onto the substrate surface and the tracking direction was 60 degrees. It was further found that a higher reproduced output/medium noise ratio was obtained when the angle between the axis of easy magnetization projected onto the substrate surface and the tracking direction was in a range of from 30 degrees to 75 degrees compared with the case where the angle was 0 degree.

Figure 7A:
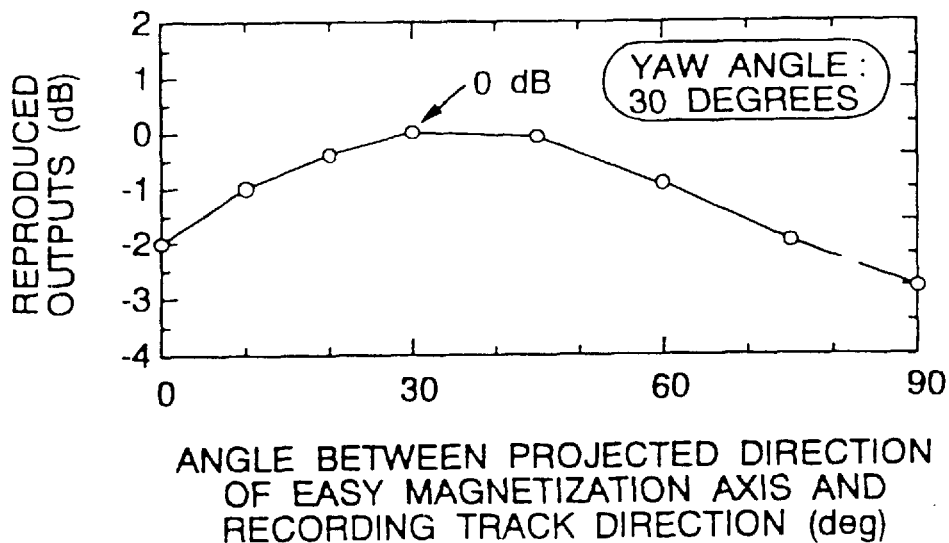
FIG. 7 is a graph showing examples of read-write characteristics measured with the yaw angle of the magnetic head set to be 30 degrees upon media different in the angle between the axis of easy magnetization projected onto a substrate surface and the tracking direction.
Figure 7B:
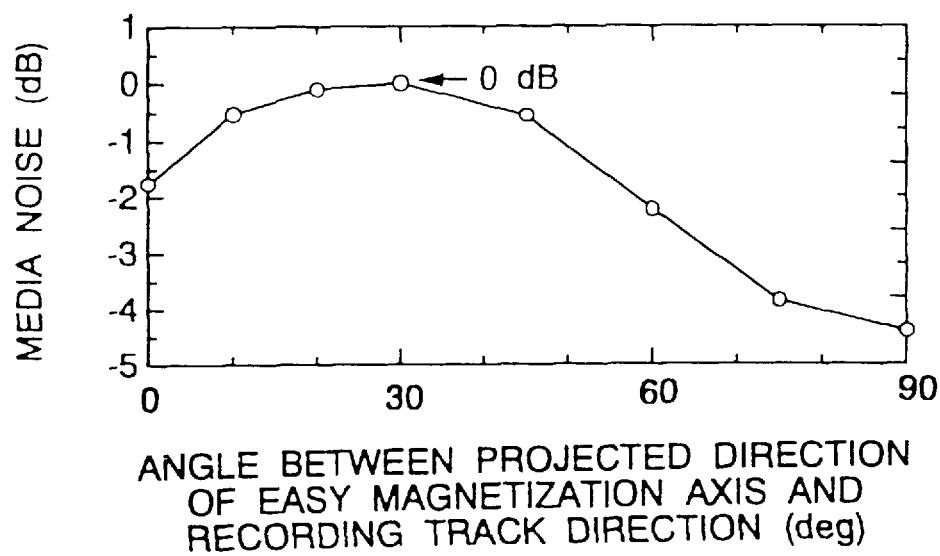
Figure 7C:
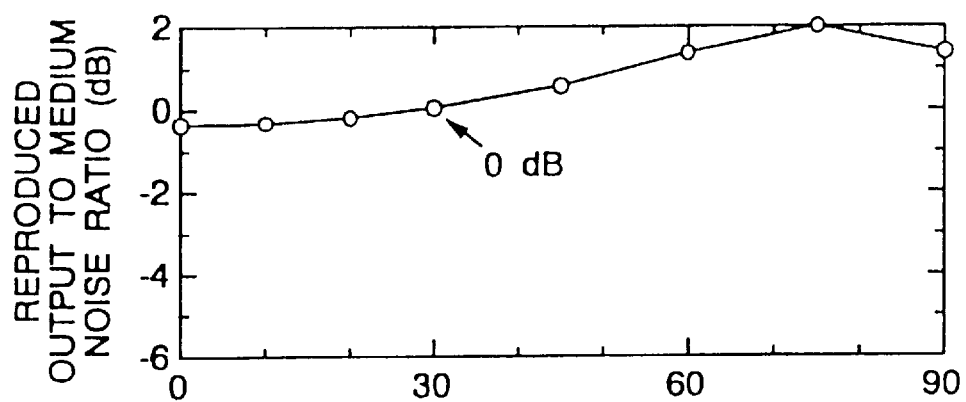

Further, the read-write characteristics were evaluated by using the same tape-like recording samples in the condition that the yaw angle of the recording head was 30 degrees. The result is shown in FIG. 7. Also in this case, because the highest reproduced output was obtained when the angle between the axis of easy magnetization projected onto the substrate surface and the tracking direction was 30 degrees, the reproduced output, medium noise and reproduced output/medium noise ratio were expressed by reference to those in the case where the angle between the axis of easy magnetization projected onto the substrate surface and the tracking direction was 30 degrees. The reproduced output was reduced if the angle between the axis of easy magnetization projected onto the substrate surface and the tracking direction was not smaller than 30 degrees, but the reduction was further smaller compared with the case where the yaw angle was 0 degree or 15 degrees. On the other hand, in the sample in which the angle between the axis of easy magnetization projected onto the substrate surface and the tracking direction was not smaller than 30 degrees, the medium noise was reduced greatly and, as a result, the highest reproduced output/medium noise ratio was obtained in the case where the angle between the axis of easy magnetization projected onto the substrate surface and the tracking direction was 75 degrees. It was further found that a higher reproduced output/medium noise ratio was obtained when the angle between the axis of easy magnetization projected onto the substrate surface and the tracking direction was in a range of from 45 degrees to 90 degrees compared with the case where the angle was 0 degree. That is, even in the case where the angle was 90 degrees, the reproduced output medium noise was high.

It was apparent from the above description that a higher reproduced output/medium noise ratio was obtained when the angle between the axis of easy magnetization projected onto the substrate surface and the tracking direction was in a range of from 10 degrees to 45 degrees compared with the angle of 0 degree even in the case where the yaw angle of the magnetic head was 0 degree, and that a higher reproduced output/medium noise ratio was obtained when the angle between the axis of easy magnetization projected onto the substrate surface and the tracking direction was large by providing a yaw angle in the magnetic head.

EXAMPLE 3

On a disk substrate having a Parmalloy film provided as a high permeability layer, a Ti film and a Co—Cr—Ta film were formed in the same manner as in Example 1 so as to produce a disk having the axis of easy magnetization inclined radially with respect to the direction perpendicular to the film surface. Further, for comparison, a Ti film and a Co—Cr—Ta film were formed on a disk substrate having the same Parmalloy film as described above by an ordinary sputtering method to thereby produce a disk having an axis of easy magnetization oriented to the perpendicular direction.

With respect to the two kinds of disks thus produced, read-write characteristics were evaluated by using a single pole type head while changing the yaw angle. The reproduced output, medium noise and reproduced output/medium noise ratio in the case where recording was made in the condition of the linear recording density of 150 kFCI are shown in Tables 2, 3 and 4, respectively.

TABLE 2

| yaw angle | (perpendicular magnetic recording layer/high permeability layer) disk | (obliquely oriented magnetic layer/high permeability layer) disk |
|---|---|---|
| 0 degree | 0 dB (reference) | −2.4 dB |
| 15 degrees | −0.7 dB | −0.7 dB |
| 30 degrees | −2.6 dB | −0.9 dB |
| 45 degrees | −6.2 dB | −1.5 dB |

TABLE 3

| yaw angle | (perpendicular magnetic recording layer/high permeability layer) disk | (obliquely oriented magnetic layer/high permeability layer) disk |
|---|---|---|
| 0 degree | 0 dB (reference) | −3.5 dB |
| 15 degrees | −0.3 dB | −4.5 dB |

TABLE 3-continued

| yaw angle | (perpendicular magnetic recording layer/high permeability layer) disk | (obliquely oriented magnetic layer/high permeability layer) disk |
|---|---|---|
| 30 degrees | −1.4 dB | −4.7 dB |
| 45 degrees | −3.3 dB | −5.1 dB |

TABLE 4

| yaw angle | (perpendicular magnetic recording layer/high permeability layer) disk | (obliquely oriented magnetic layer/high permeability layer) disk |
|---|---|---|
| 0 degree | 0 dB (reference) | +1.2 dB |
| 15 degrees | −0.4 dB | +3.8 dB |
| 30 degrees | −1.2 dB | +3.8 dB |
| 45 degrees | −2.9 dB | +3.6 dB |

Incidentally, the value obtained when an nary perpendicular magnetic recording layer was used the yaw angle was set to be 0 degree was expressed to be 0 dB as a reference value in comparison. Further, the measured values of the read-write characteristics were expressed in the Tables by using the values of reproduced output and medium noise measured by the head without any correction corresponding to the change of the yaw angle as in Example 1.

As shown in Table 2, the disk having the magnetic recording layer oriented radially obliquely was low in the reproduced output compared with the disk using the ordinary perpendicular magnetic recording layer in the case where the yaw angle was 0 degree, but the disk having the magnetic recording layer oriented radially obliquely exhibited a higher reproduced output than the disk using the ordinary perpendicular magnetic recording layer in the case where the yaw angle was not smaller than 15 degrees.

On the other hand, as shown in Table 3, the disk having the radially obliquely oriented magnetic recording layer exhibited extremely lower medium noise characteristic than the disk using the ordinary perpendicular magnetic recording layer. As a result, it was apparent from Table 4 that the disk having the radially obliquely oriented magnetic recording layer exhibited a higher reproduced output/medium noise ratio than the disk using the ordinary perpendicular magnetic recording layer even in the case where the yaw angle was 0 degree.

According to the present invention, oblique recording can be realized by means of a circular disk only by slightly changing a conventional process of producing a medium and a head. Accordingly, the reproduced output/medium noise ratio, linear recording density and track density can be improved greatly compared with the conventional longitudinal recording. Accordingly, the longitudinal recording density of the magnetic read-write apparatus can be improved greatly so that the present invention is useful for high-density recording.

What is claimed is:

1. A magnetic recording medium, comprising a surface containing a track extending in a direction, on which track information is to be magnetically recorded by means of a magnetic head, said magnetic recording medium having an axis of easy magnetization, which when viewed in the plane of said surface is unidirectionally inclined with respect to the direction of said track on which information is to be recorded.

2. A magnetic recording medium according to claim 1, wherein said axis of easy magnetization lies in a normal plane of the magnetic recording medium.

3. A magnetic recording medium according to claim 1 or 2, wherein when said axis of easy magnetization is viewed in the plane of the surface of the magnetic recording medium it makes an angle of not smaller than 20 degrees with respect to said direction of said track on which information is to be recorded.

4. A magnetic recording medium according to claim 3, wherein when said axis of easy magnetization is viewed in the plane of the surface of the magnetic recording medium it makes an angle of not smaller than 30 degrees with respect to said direction of said track on which information is to be recorded.

5. A magnetic recording medium according to claim 3, wherein when said axis of easy magnetization is viewed in the plane of the surface of the magnetic recording medium it is substantially perpendicular to said direction of said track on which information is to be recorded.

6. A magnetic recording medium according to claim 1 or 2, wherein said magnetic recording medium is a magnetic recording medium formed on a circular non-magnetic substrate.

7. A magnetic recording medium according to claim 1 or 2, wherein said magnetic recording medium is a magnetic recording medium formed on a circular non-magnetic substrate through a soft magnetic recording layer of high permeability.

8. A magnetic recording medium according to claim 3, wherein said magnetic recording medium is a magnetic recording medium formed on a circular non-magnetic substrate.

9. A magnetic recording medium according to claim 3, wherein said magnetic recording medium is a magnetic recording medium formed on a circular non-magnetic substrate through a soft magnetic recording layer of high permeability.

10. A magnetic recording medium according to claim 4, wherein said magnetic recording medium is a magnetic recording medium formed on a circular non-magnetic substrate.

11. A magnetic recording medium according to claim 4, wherein said magnetic recording medium is a magnetic recording medium formed on a circular non-magnetic substrate through a soft magnetic recording layer of high permeability.

12. A magnetic recording medium according to claim 5, wherein said magnetic recording medium is a magnetic recording medium formed on a circular non-magnetic substrate.

13. A magnetic recording medium according to claim 5, wherein said magnetic recording medium is a magnetic recording medium formed on a circular non-magnetic substrate through a soft magnetic recording layer of high permeability.

14. A magnetic recording medium, comprising a magnetic recording medium formed on a tape-like non-magnetic substrate extending in a longitudinal direction and wherein when said axis of easy magnetization is viewed in the plane of the surface of the magnetic recording medium it makes an angle with said longitudinal direction of said tape-like non-magnetic substrate.

15. A magnetic recording medium according to claim 14, wherein when said axis of easy magnetization is viewed in the plane of the surface of the magnetic recording medium it makes an angle of not smaller than 30 degrees with respect to said longitudinal direction of said tape-like non-magnetic substrate.

16. A magnetic recording medium according to claim 14, wherein the axis of easy magnetization of said magnetic recording medium, when said axis of easy magnetization is viewed in the plane of the surface of the magnetic recording medium is substantially perpendicular to the longitudinal direction of said tape-like non-magnetic substrate.

* * * * *

UNITED STATES PATENT AND TRADEMARK OFFICE
CERTIFICATE OF CORRECTION

PATENT NO. : 5,875,082

DATED : 2/23/99

INVENTOR(S) : Takayama et al.

It is certified that error appears in the above-identified patent and that said Letters Patent is hereby corrected as shown below:

Column 10, line 65-66, delete "and wherein when said" and insert --having an--.

Column 10, line 66, delete "is" and insert --which, when--.

Column 10, line 67, delete --it--.

Signed and Sealed this

Sixth Day of April, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT : 5,875,082

DATED : February 23, 1999

INVENTOR(S) : Takayama et al.

It is certified that error appears in the above-identified patent and that said Letters Patent is hereby corrected as shown below:

On the title page, item [73] Assignee, should read:

Hitachi, LTD., Tokyo, Japan and Hitachi Maxell, LTD., Ibaraki-shi, Japan

Signed and Sealed this

Sixteenth Day of November, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,875,082
DATED : February 23, 1999
INVENTOR(S) : Takanobu Takayama, et. al.

It is certified that error appears in the above-identified patent and that said Letters Patent is hereby corrected as shown below:

| Column | Line | |
|---|---|---|
| 9 | 22 | Change "nary" to --ordinary--. |
| 10 | 65 | Change "and wherein" to --having an--. |
| 10 | 66 | Delete "when said"; change "is" to --which when--. |
| 10 | 67 | Delete "it". |

Signed and Sealed this

Twenty-seventh Day of February, 2001

Attest:

NICHOLAS P. GODICI

Attesting Officer     Acting Director of the United States Patent and Trademark Office